(12) United States Patent
Prystupa et al.

(10) Patent No.: US 11,740,127 B2
(45) Date of Patent: Aug. 29, 2023

(54) HIGH THROUGHPUT MULTIPLEX SPECTROSCOPY

(71) Applicant: 11887041 Canada Ltd., Winnipeg (CA)

(72) Inventors: David Allan Prystupa, Pinawa (CA); John Stephen Pacak, Winnipeg (CA)

(73) Assignee: 11887041 Canada Ltd., Winnipeg (CA)

( * ) Notice: Subject to any disclaimer, the term of this patent is extended or adjusted under 35 U.S.C. 154(b) by 0 days.

(21) Appl. No.: 17/481,542

(22) Filed: Sep. 22, 2021

(65) Prior Publication Data

US 2022/0099492 A1 Mar. 31, 2022

Related U.S. Application Data

(60) Provisional application No. 63/084,310, filed on Sep. 28, 2020.

(51) Int. Cl.
| | |
|---|---|
| *G01J 3/433* | (2006.01) |
| *G01J 3/28* | (2006.01) |
| *G01N 21/31* | (2006.01) |

(52) U.S. Cl.
CPC ............ *G01J 3/433* (2013.01); *G01J 3/2846* (2013.01); *G01N 21/314* (2013.01); *G01N 2201/1293* (2013.01)

(58) Field of Classification Search
None
See application file for complete search history.

(56) References Cited

U.S. PATENT DOCUMENTS

| | | | | |
|---|---|---|---|---|
| 7,944,557 | B2* | 5/2011 | Hagler | G01J 3/42 |
| | | | | 356/330 |
| 2005/0117707 | A1* | 6/2005 | Baier | G21K 1/04 |
| | | | | 378/156 |
| 2005/0270528 | A1 | 12/2005 | Geshwind et al. | |
| 2018/0329191 | A1* | 11/2018 | Cheng | G02B 21/06 |
| 2018/0340893 | A1* | 11/2018 | Prystupa | G01J 3/0294 |
| 2020/0149931 | A1 | 5/2020 | Prystupa et al. | |

* cited by examiner

*Primary Examiner* — Tarifur R Chowdhury
*Assistant Examiner* — Roberto Fabian, Jr.
(74) *Attorney, Agent, or Firm* — Adrian D. Battison; Ade & Company Inc.; Ryan W. Dupuis (57) ABSTRACT

A method for measuring a property of radiation from different sources such as moving particles or different spatial locations on each particle includes providing a spatial modulator common to all of the sources having a sequence of configurations, each of which configurations causes the radiation flux to pass along paths to respective modulation ports and cycling the common spatial modulator past each of the modulation ports so that the sequence of configurations is applied to each modulation port. The sequence of configurations comprises an ordered array of optical elements on a substrate. In one embodiment, the modulator is arranged in a circle around an axis of rotation of a rotating singulation disk. At least one source is a reference source which has not interacted with the source to be analyzed and the sample and reference sources are compared.

32 Claims, 5 Drawing Sheets

HIGH THROUGHPUT MULTIPLEX SPECTROSCOPY

This application claims the benefit under 35 USC 119 (e) from provisional application 63/084,310 filed Sep. 28, 2020.

The invention relates to a method for improving the throughput and speed of multiplex imaging, spectroscopy, and spectral imaging systems. The invention is directed primarily to applications requiring high throughput over multiple channels.

This disclosure relates generally to arrays of multiplex spectrometers. One example described herein is a spectrometer array used for sorting objects based on spectral properties. The methods described herein may be used for measuring spectral properties of multiple streams of objects.

RELATED APPLICATIONS

Prior U.S. Pat. No. 8,227,719 published Jul. 24, 2012 of the present inventor shows a method for detecting optically diseased kernels, the disclosure of which is incorporated herein by reference or may be referenced for further detail.

This disclosure is related to a spectrometer disclosed in the patent entitled High Efficiency Multiplexing, hereafter "HEMS patent" by the present inventors described in U.S. Pat. No. 10,585,044 issued Mar. 10, 2020, the disclosures of which are incorporated herein by reference.

This disclosure is related to a modulation device disclosed in the patent application entitled Spatial Modulation Device, hereafter "SMD patent" by the present inventors described in PCT Publication WO 2020/097733 published May 22, 2020, the disclosures of which are incorporated herein by reference which corresponds to U.S. Ser. No. 16/683,376 filed on Nov. 14, 2019.

This disclosure is related to "Method and Apparatus for Singulating Particles in a Stream" by the present inventors described in U.S. Pat. No. 10,933,447 issued Mar. 2, 2021, hereafter referred to as the Singulation patent which corresponds to PCT Publication WO 2018/018155 published Feb. 1, 2018, the disclosures of which are incorporated herein by reference.

BACKGROUND OF THE INVENTION

As shown in the above defined singulation patent, the quality characteristics of food items may be non-invasively assessed with spectral measurements. Items with different quality characteristics are subsequently directed along different paths based on the spectral measurements. The commercial uptake of spectral inspection systems is limited by the number of items that can be inspected per unit time (throughput) and the cost per item of said inspection. Increasing the speed of measurement comes at the cost of reduced signal to noise ratio (SNR), which reduces the utility of spectral data so collected. Throughput can be increased by increasing the number of spectrometer units, but the cost of the units limits the range of economically viable applications. Further, the spectrometer units must be calibrated to a common standard adding to system complexity. There is thus a need for a spectral system with lower cost per item measured and improved SNR performance enabling increased throughput.

SUMMARY OF THE INVENTION

According to the invention there is provided a method for measuring a property of each of a plurality of radiation fluxes comprising the steps of where each radiation flux arises from a different one of a plurality of radiation sources;

collecting each radiation flux independently of others of the plurality of radiation fluxes;

providing a spatial modulator common to all of the radiation sources;

the common spatial modulator having a sequence of configurations, each of which configurations causes the radiation flux to pass along one or more modulated flux paths each radiation flux being associated with a respective one of a plurality of separate modulation ports where each radiation flux passes to a respective one of the modulation ports;

cycling the common spatial modulator past each of the modulation ports so that the sequence of configurations is applied to each modulation port;

providing a plurality of detectors associated with the radiation fluxes and for each radiation flux measuring an amplitude of the radiation flux along each modulated flux path;

and analyzing the radiation flux amplitudes associated with each modulation port to provide information about a property of the radiation flux from each of the plurality of radiation sources.

In accordance with one important feature, further the radiation flux from each different source is directed by the sequence of configurations in different directions based on a property of the radiation flux.

In accordance with one important feature, the detectors are carried on a first member which is in relative motion with respect to the common spatial modulator.

In accordance with one important feature, the common spatial modulator is moved relative to the modulation ports so that the sequence of configurations moves past each of the modulation ports in turn.

In accordance with one important feature, the common spatial modulator is arranged in a circle around an axis of rotation and at least one of the common spatial modulator and the modulation ports are rotated relative to one another around the axis.

In accordance with one important feature, the common spatial modulator is arranged in a cylindrical surface surrounding the axis.

In accordance with one important feature, the common spatial modulator is stationary and the modulation ports are carried on a rotating body.

In accordance with one important feature, each source comprises a particle, the properties of which are to be analyzed and the radiation flux is interaction radiation reflected, scattered or emitted from the particle.

In accordance with one important feature, at least one source is a reference source and the radiation flux has not interacted with a particle.

In accordance with one important feature, the particles are singulated in an aligned row of the particles in a respective one of a plurality of singulation ducts.

In accordance with one important feature, the method includes measuring a position of the common spatial modulator at said two different times.

In accordance with one important feature, the sequence of configurations comprises an ordered array of optical elements on a substrate and the array of optical elements has at least three optical elements and at least two optical elements which modulate said radiation incident thereon differently.

In accordance with one important feature, the optical elements of the spatial modulator direct electromagnetic radiation to be modulated into at least two and preferably three different directions.

In accordance with one important feature, the optical elements of the common spatial modulator produce at least two and preferably at least three different phase changes in the electromagnetic radiation to be modulated.

In accordance with one important feature, the optical elements of the common spatial modulator alter the polarization of incident radiation to be modulated in at least two and preferably three different ways.

In accordance with one important feature, the optical elements of the spatial modulator are integral to the substrate material.

In accordance with one important feature, the optical elements are chosen from the set of aperture, mirror, diffraction grating, phase plate, reflecting wedge, refracting prism, and polarizer.

In accordance with one important feature, the optical elements comprise mirrors that can take at least two different configurations.

In accordance with one important feature, at least one mirror changes configuration at least once and said configuration change occurs when said mirror is not exposed to electromagnetic radiation to be modulated.

In accordance with one important feature, the position measurement uses a component integral to the common spatial modulator and proximate to optical elements thereon.

In accordance with one important feature, the common spatial modulator is a flexible body forming a closed loop where the body is translated around the loop and the optical elements are arranged along the direction of translation.

In accordance with one important feature, the substrate is a rotating disk and the optical elements are arranged at a common radial distance from a rotation axis.

The invention is an array of logical multiplex spectrometer units wherein each unit in the array accepts an independent radiation flux as input and outputs a spectrum of that radiation flux. Each independent unit is termed a channel. Each logical multiplex spectrometer unit has all of the physical parts of a stand-alone multiplex spectrometer, but shares with other logical units at least a physical spatial modulator. The logical multiplex spectrometer units may be of the Hadamard type or of the Fourier Transform type or of the type described in the above cited HEMS patent. The multiplex spectrometer described in the above cited HEMS patent is however preferred due to a signal to noise advantage of 2.5 times or more over the other types.

Each logical multiplex spectrometer unit in the array receives an input flux of radiation and with a directing arrangement directs input radiation with different properties to different locations on the common spatial modulator. The spatial modulator cycles through a sequence of different configurations and for each configuration directs radiation with a different combination of properties to one or more detectors. The amplitude of each combination of modulated radiation is measured and a set of linear equations is solved to determine the properties of the input flux. Radiation may be directed based on a property chosen from the set of wavelength, phase, polarization, propagation direction or source location, or combination thereof. For example, the directing operation may be performed by a diffraction grating or a prism directing radiation along different paths based on wavelength. For example, the directing operation may by performed by an interferometer wherein the interferometer directs an interference pattern onto the spatial modulator. The interference pattern consists of a spatially varying phase difference between two or more interfering radiation beams. For example, the direction operation may be performed by optical elements such as lenses and mirrors that focus radiation from different locations or directions onto different locations on the spatial modulator. Cost and system complexity of the system are reduced by the arrangement herein of sharing the spatial modulator.

The input flux for each channel is directed with a range of incident angles onto a modulation region of the common spatial modulator. The modulation region is taken as the intersection of the directed radiation with a logical mask stationary in the frame of reference of the directing arrangement and infinitesimally close to the spatial modulator. The combination of incident angles and modulation region proximate to the common spatial modulator is termed a "modulation port" herein. The common spatial modulator has a plurality of unique modulation ports. Each logical multiplex spectrometer unit includes one exclusive modulation port. Each modulation port contains N modulator optical elements where N is the length of a modulation code. The common spatial modulator is shifted through an ordered temporal sequence of M configuration states wherein $M=qN$ and wherein q is a real number greater than or equal to one and M is an integer. At least N of the M configuration states are different. The configuration states associated with some or all modulation ports may be degenerate: that is the configuration states of degenerate modulation ports modulate radiation in the same way. The configuration states associated with some or all modulation ports may be different: that is the configuration states associated different modulation ports modulate radiation differently.

In accordance with an important feature of the invention there is provided a radiation directing arrangement that operates to direct radiation with different properties to different locations on a modulation surface. The radiation directing arrangement may for example be a grating or a prism that directs radiation with different wavelengths to different locations on a modulation surface.

In accordance with an important feature of the invention the common spatial modulator comprises a substrate with an array of spatial regions wherein there are at least two different types of spatial regions and wherein each type of spatial region directs incident radiation in a common direction different from other types of spatial regions. Each different direction is termed a "modulated flux path". The array of spatial regions may be one dimensional or two dimensional. The spatial modulator contains at least $M=qN$ spatial regions, where M and N are integers greater than two and q is a real number greater than or equal to one. The spatial modulator has a plurality of modulation ports wherein each modulation port contains N spatial regions and wherein each modulation port has a unique average angle of incidence. The arrangement of the two or more different types of spatial regions within a modulation port forms a code sequence of length N. The spatial regions within a modulation port are termed "code locations" herein. The spatial modulator may for example be the encoder belt described in the above cited SMD patent. The common spatial modulator may for example be a cylindrical encoder. The spatial modulator may for example be a disk encoder. The spatial modulator may for example be a micro-mirror array wherein each modulation port is defined by a different angle of incidence. In some embodiments, the different modulation ports may partially overlap.

In accordance with an important feature of the invention there is provided at least one measurement arrangement for each modulated particle flux path. There may be a plurality of measurement arrangements for each modulation port. For example, there is a plurality of measurement arrangements in a HEMS spectrometer as described in the above cited HEMS patent. For example, the measurement arrangement may be a detector array that measures a modulated property in one direction and an un-modulated property in another (usually orthogonal) direction. The modulated property may for example be wavelength and the un-modulated property may for example be a spatial coordinate. Upon demodulation, this example produces a linear spectral image.

In accordance with an important feature of the invention there is provided a control system which includes a computation device, a data storage device and a communication device. The computation device includes algorithms that analyze measurements to provide information about the incident particle flux. The computation device includes algorithms that function to coordinate the common spatial modulator and position measurement. The control device may be shared by a plurality of logical multiplex spectrometer units.

In accordance with an important optional feature of the invention there is provided at least one position measurement device. The position measurement device measures at least one configuration parameter of the spatial modulator and said configuration parameter is used to determine the current code sequence for one or more modulation ports. For example, the position measurement device may be the position measurement device described in the above cited SMD patent.

In an important exemplary embodiment that may be used in combination with any of the preceding or following embodiments, the common spatial modulator is a coded cylinder with a plurality of code sequences of length N arranged around the circumference. A plurality of modulation ports is arranged symmetrically about the axis of the code cylinder on a frame that is in relative rotational motion with respect to the coded cylinder. As the cylinder is relatively rotated, the sequence of codes on the cylinder within each modulation port changes. The amplitude of modulated radiation is measured for each code sequence. In some embodiments the relative rotation is at a uniform angular velocity. For example, a synchronous motor may provide uniform relative rotation. In some embodiments the relative rotation is discontinuous. For example, a stepper motor may provide discontinuous relative rotation.

In an important embodiment that may be used in combination with any of the preceding or following embodiments, the modulation may be carried out by a digital micro mirror array. For example, a plurality of modulation ports may be defined by different ranges of incident angles and the entire area of micro mirrors. For example, a plurality of modulation ports may be defined by separate areas of the micro-mirror array.

In an important embodiment that may be used in combination with any of the preceding or following embodiments, the modulation may be carried out by an encoder belt wherein different modulation patterns are generated by relative motion between the incident particle flux and the encoder belt. The encoder belt may for example be of the type described in the above cited SMD patent.

In an important embodiment that may be used in combination with any of the preceding or following embodiments, the code sequences are cyclic permutations of a base sequence.

In an important embodiment that may be used in combination with any of the preceding or following embodiments, the encoder is a disk.

In an important embodiment that may be used in combination with any of the preceding or following embodiments, the encoder sequence is spatially discontinuous. The encoder may for example contain both coding and non-coding regions. The non-coding regions may for example correspond to locations of seams or structural supports.

In an important embodiment that may be used in combination with any of the preceding or following embodiments, at least one radiation source is a sample radiation source, at least one radiation source is a reference radiation source, and the sample and reference sources are compared. For example, radiation from a black body radiator may be split into two portions with a beam splitter and first portion is directed to a first modulation port (reference) and a second portion is incident on a sample material producing interaction radiation that that is directed to a second modulation port (sample). In some embodiments there may be a single modulation port receiving reference radiation and a plurality of modulation ports receiving sample interaction radiation from a plurality of sample materials.

In an important embodiment that may be used in combination with any of the preceding or following embodiments, a plurality of modulation ports may receive interaction radiation from different spatial regions of a sample material. This embodiment may be used to generate a two-dimensional spectral image. For example, each detector location at each modulation port may be a linear array of detectors wherein the array axis is perpendicular to the modulation direction and each adjacent element of the detector array measures radiation amplitudes from adjacent regions in the unmodulated direction. The row of detectors forms a row of pixels in a spectral image. A plurality of modulation ports configured in the same manner may each receive radiation amplitudes from sample regions along the modulation direction with each modulation port corresponding to a column of pixels in a spectral image.

Implementation of the method and system herein involves performing or completing selected tasks or steps manually, automatically, or a combination thereof. Moreover, according to actual instrumentation and equipment of preferred embodiments of the method and system herein, several selected steps can be implemented by hardware or by software on any operating system of any firmware or a combination thereof. For example, as hardware, selected steps of the invention can be implemented as a chip or a circuit. As software, selected steps of the invention can be implemented as a plurality of software instructions being executed by a computer using any suitable operating system. In any case, selected steps of the method and system herein can be described as being performed by a data processor, such as a computing platform for executing a plurality of instructions.

DETAILED DESCRIPTION

Embodiments of the present disclosure are described in detail with reference to the accompanying drawings. Detailed descriptions of constructions or processes known in the art may be omitted to avoid obscuring the subject matter of the present disclosure. Further in the following description of the present disclosure, various specific definitions found in the following description are provided to give a general understanding of the present disclosure, and it is apparent to those skilled in the art that the present disclosure can be implemented without such definitions.

Figure 1A:
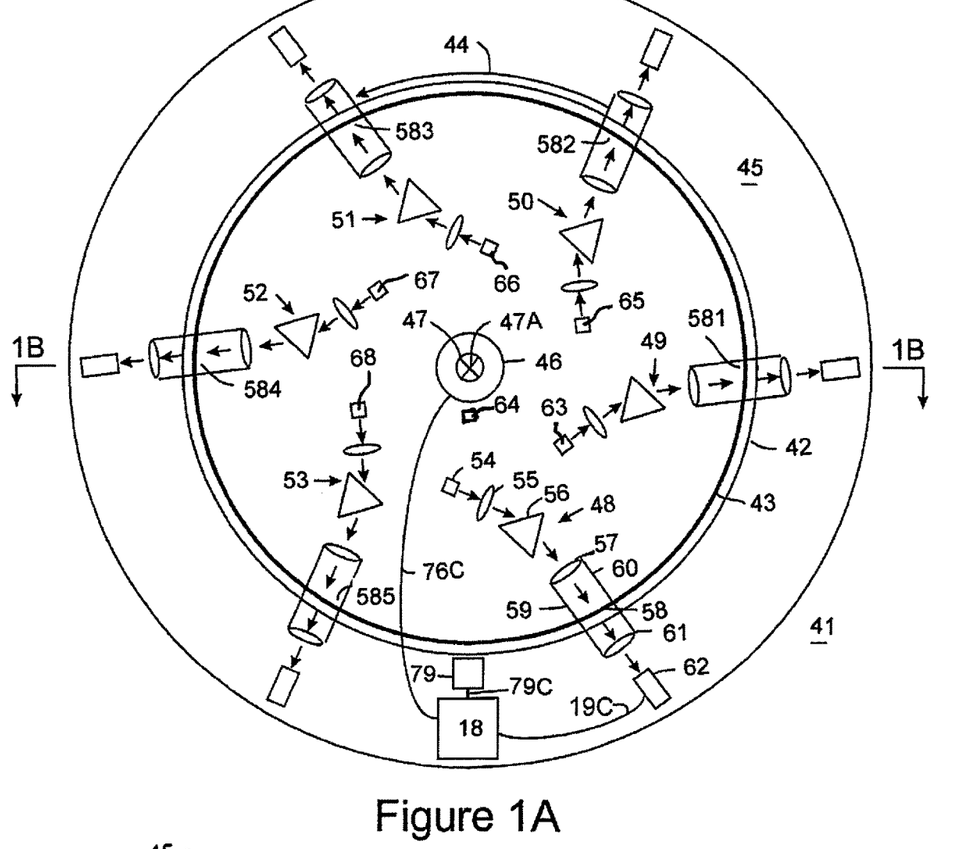
FIG. 1A is a schematic illustration showing a plan view of a high throughput multiplex spectroscopy system with a cylindrical spatial modulator according to the present invention.

FIG. 1A shows a schematic plan view of a preferred embodiment of the invention generally indicated at 41. A first platform 42 has cylindrical spatial modulator 43 rigidly attached thereto. A second platform 45 is made to rotate relative to first platform 22 about axis 47A by motor 46 attached to drive shaft 7. As shown, the first platform 42 is stationary and the second platform 45 rotates as shown at 44. In an alternative embodiment the second platform 45 is stationary and the first platform 42 rotates. In another alternative embodiment, platforms 42 and 45 rotate at different rates relative to a stationary frame of reference. All that is required is relative rotation between platforms 42 and 45.

As shown the second platform 45 has six identical logical multiplex spectrometer units rigidly attached indicated at 48, 49, 50, 51, 52, and 53. Logical multiplex spectrometer 48 includes radiation source 54, collimation optics 55, dispersive element 56, focusing optics 57, modulation port 58, collection optics 61 and radiation detector 62. The optical arrangement shown is for illustrative purposes only. Other optical arrangements may be used. The only optical elements essential to the invention are the radiation source 54, modulation port 58 and detector 62.

Radiation source 54 represents a flux of radiation collected from a sample region. Radiation source 54 may for example be a relay mirror directing radiation collected from the sample region by focusing optical elements (not shown). Radiation source 54 may for example be a fiber optic transmitting a flux of radiation collected from a sample region by focusing optical elements (not shown). A primary radiation source 64 may for example be a relay mirror directing radiation collected directly from a black body or a bulb by focusing optical elements (not shown). This source 64 directs radiation to the flux source 54 of the spectrometer unit 48 and to the flux source 63 of the spectrometer unit 49. The source 53 is thus derived directly from the primary source 64 without interaction with the sample. If radiation source 54 is interaction radiation derived from radiation from the black body or bulb source incident on a sample, the ratio of amplitudes from radiation sources 54 and 63 may be used to compute a transmittance spectrum, a reflection spectrum or an absorbance spectrum. Radiation sources 54, 63, 65, 66, 567 and 68 of the units 48 to 53 respectively may for example be optical elements transmitting flux from adjacent regions of a sample material and the spectra calculated for each region from the modulated flux are combined to form a spectral image.

However also the units 48 to 53 may comprise independent units each associated with a separate channel of a singulator and operating independently on singulated particles in the respective channels.

In an exemplary embodiment, the sample region is a food particle illuminated by broadband near infrared radiation and radiation scattered and/or transmitted by the food particle is collected and directed to radiation source 54. Further, in the exemplary embodiment the food particle is singulated by the arrangement described in the above cited Singulation patent. The singulation arrangement may be integral with the second platform 45 with the motor 46 providing relative rotation for both the singulation process and for the spatial modulation process. The singulated food particle may for example be a wheat kernel.

Collimation optics 55 may be a first optical element that focuses radiation from source 54 through an aperture and a second optical element that focuses divergent radiation from the aperture into a collimated beam. In some arrangements radiation source 54 may be small enough to serve as the aperture, in which case only the second optical element is used.

Collimated radiation is directed to dispersion element 56 which may for example be a prism as shown schematically. Alternately dispersion element 56 may be a diffraction grating. Dispersion element is in general any optical element that directs radiation in different directions based on a property of the radiation such as wavelength, phase, or polarization.

Dispersed radiation is directed to focusing element 57 that images radiation with different properties onto modulation port 58. The bounds of modulation port 58 are indicated at 59 and 60. Modulation port 58 is a surface infinitesimally close to spatial modulator 43 bounded by the lines at 59 and 60. For example, radiation dispersed by dispersion element 56 may be focused by element 57 with increasing wavelength from 59 to 60 along modulation port 58.

In the axial direction 47A radiation focused incident on modulation port 58 may vary with some spatial dimension of the sample region. For example, radiation in the axial direction of modulation port may vary along a wheat kernel axis in the exemplary embodiment.

Radiation incident on modulation port 58 is modulated by the spatial modulator 43 and the modulated radiation is focused by focusing element 61 onto detector 62, which measures the amplitude of the modulated radiation. As shown in FIG. 1A there is one modulation path and one detector associated with each modulation port corresponding to the Hadamard case.

In HEMS embodiments (shown in FIG. 2A and FIG. 2B) there may be a plurality of modulation paths and a detector associated with each modulation path. Detector 62 is in communication with control device 78 as indicated at 79C. Control device 78 is in communication with motor 46 as indicated at 76C and is operable to regulate the rate of relative rotation between the first and second platforms 42 and 45, respectively. As indicated at 79C, control means 78 is in communication with displacement sensor 79 operable to measure the relative angular displacement between the first and second platforms 42 and 45, respectively. Sensor 79 is preferably the displacement measuring arrangement described in the above cited SMD patent. Alternately sensor 79 may be any magnetic or optical device that measures relative angular displacement. Control means 78 uses the measured angular displacement to determine the code sequence operable at each instant at modulation ports 58, 581, 582, 583, 584, and 585 of logical multiplex spectrometers 48 to 53, respectively. Each logical multiplex spectrometer is in communication with control 78 in the same manner as indicated for unit 48. For simplicity, only the connection with unit 48 is illustrated. Control means 78 constructs a data vector for each channel and associated modulator port using the code sequences operable at the modulation port to determine the position in the data vector assigned to each measurement of modulated flux amplitude. Each element of the data vector corresponds with a different displacement between platforms 42 and 45 as measured by sensor 79. As described in the above cited SMD patent, the amplitude assigned to each element of the data vector may be obtained via least squares fit to a sequence of measurements at made at positions proximate to a calibrated edge of the code sequence. In the Hadamard case one modulated flux amplitude is associated with each modulation port per code sequence. In the HEMS case a plurality of flux amplitudes is associated with each modulation port per code sequence. Control device 78 solves a system of equations involving the code sequences and associated amplitudes to determine properties of the radiation flux at each channel and associated modulation port. A full description of the calculation is given in the above cited HEMS patent.

Spatial modulation is effected by the rotation of cylindrical spatial modulator 43 relative to modulation ports 58 and 581 to 585. Each modulation port uses every part of spatial modulator 43 over one complete revolution of platform 45 relative to spatial modulator 43. At any instant only the portion of spatial modulator 43 immediately proximate to each modulation port is used. Spatial modulator 43 may have a fixed modulation pattern, in which case the modulation code sequence operable at each modulation port depends only on the angular displacement between the first and second platforms. Alternately, the modulation pattern may be changed dynamically as discussed in the above cited SMD patent. The code sequences operable at each modulation port at any instant may in general be different. In some embodiments, the number of code sequences on spatial modulator 43 is an integral multiple of the number of modulation ports. In this special case, the code sequence operable at each modulation port at any instant may be identical.

Figure 1B:
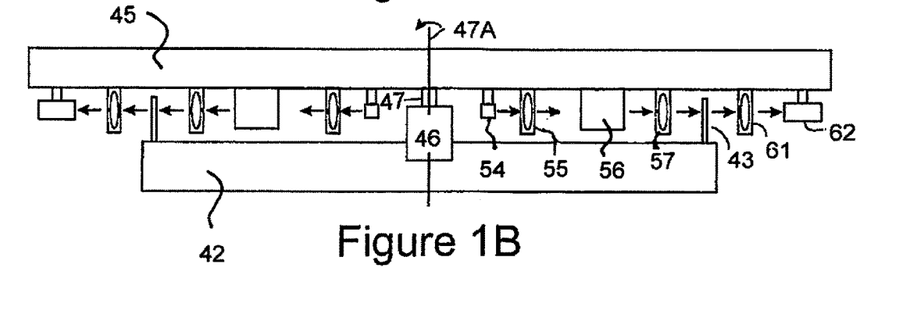
FIG. 1B is a cross-sectional view along the lines 1B-1B of FIG. 1A.

FIG. 1B shows a cross sectional view of FIG. 1A illustrating the axial arrangement of the structures discussed above.

Figure 2A:
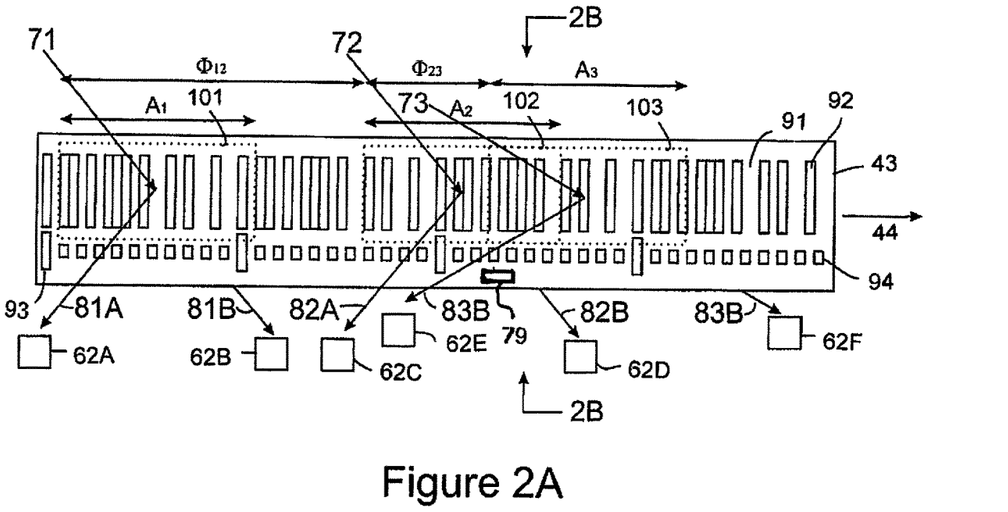
FIG. 2A is a schematic illustration showing three modulation ports on a section of spatial modulator.

FIG. 2A shows a section of spatial modulator 43 translated as shown at 44. Although the features of the spatial modulator are discussed with reference to the cylindrical example of FIG. 1A, the following description also applies to other tape, disk and mirror array spatial modulator layouts discussed in the above cited SMD patent. Spatial modulator 43 includes regions 91 that reflect incident radiation and regions 92 that transmit incident radiation. The spatial modulator may also absorb, refract, diffract, and phase modulate incident radiation as discussed in more detail in the above cited SMD patent.

As shown, spatial modulator 43 includes registration marks 93 and 94 that encode the beginning of a code sequence and displacement within a code sequence, respectively. These features are used by displacement sensor 79 as discussed in more detail in the SMD patent.

Three modulation ports are shown in FIG. 2A labeled 101, 102 and 103, respectively. Modulation port 101 has the linear extent shown at A1. Modulation port 102 has the linear extent shown at A2. Modulation port 103 has the linear extent shown at A3. In some embodiments the spatial modulation ports are spatially separate as illustrated by ports 101 and 102. The start of modulation port 102 is offset from the start of modulation port 101 by 1.12, which is greater than the port extent A1. Hence there is no spatial overlap between modulation ports 101 and 102. In some embodiments the modulation ports overlap spatially, but differ in the angle of incidence as illustrated by modulation ports 102 and 103. The offset from the start of modulation port 102 to the beginning of modulation port is 1.23, which is less than the extent A2 of modulation port 102.

A radiation flux is incident on modulation port 101 as shown at 71 and is either reflected to detector 62A along path 81A or transmitted to detector 62B along path 81B. In FIG. 1A a single detector 62 is shown corresponding to a Hadamard embodiment of the invention. In FIG. 2A detectors 62A and 62B correspond to a HEMS embodiment of the invention. The HEMS embodiment is discussed in more detail in the above cited HEMS patent.

Figure 2B:
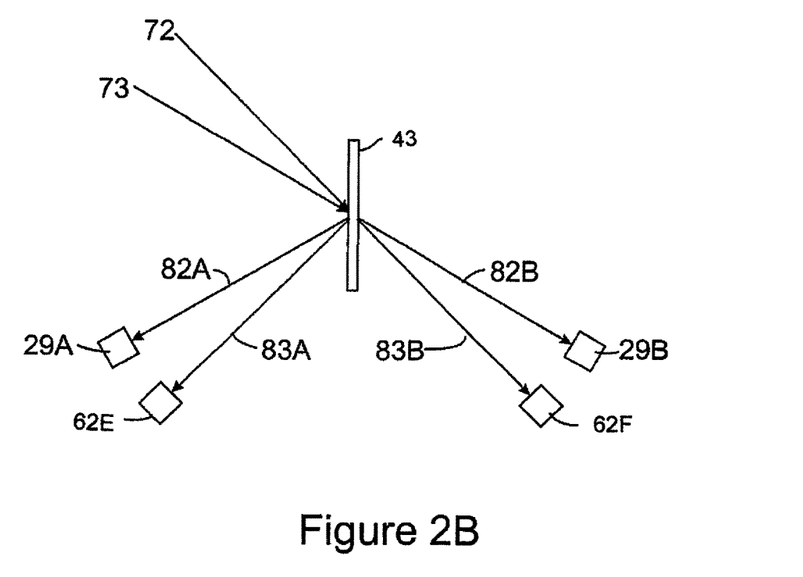
FIG. 2B a cross-sectional view along the lines 2B-2B of FIG. 2A.

A radiation flux is incident on modulation port 102 as shown at 72 and is either reflected to detector 62C along path 82A or transmitted to detector 62D along path 82B. The angle of incidence for spatial modulation port 102 as shown is the same as the angle of incidence for spatial modulation port 101. A radiation flux is incident on modulation port 103 as shown at 73 and is either reflected to detector 62E along path 83A or transmitted to detector 62F along path 83B. As best seen in FIG. 2B, the angle of incidence for radiation flux 72 and radiation flux 73 is different. As shown in FIG. 2B the reflected rays 82A and 83A are angularly separated and are detected independently by detectors 29A and 39A, respectively. Likewise, the transmitted rays 82B and 83B are angularly separated and are detected independently by detectors 29B and 39B, respectively.

Figure 3:
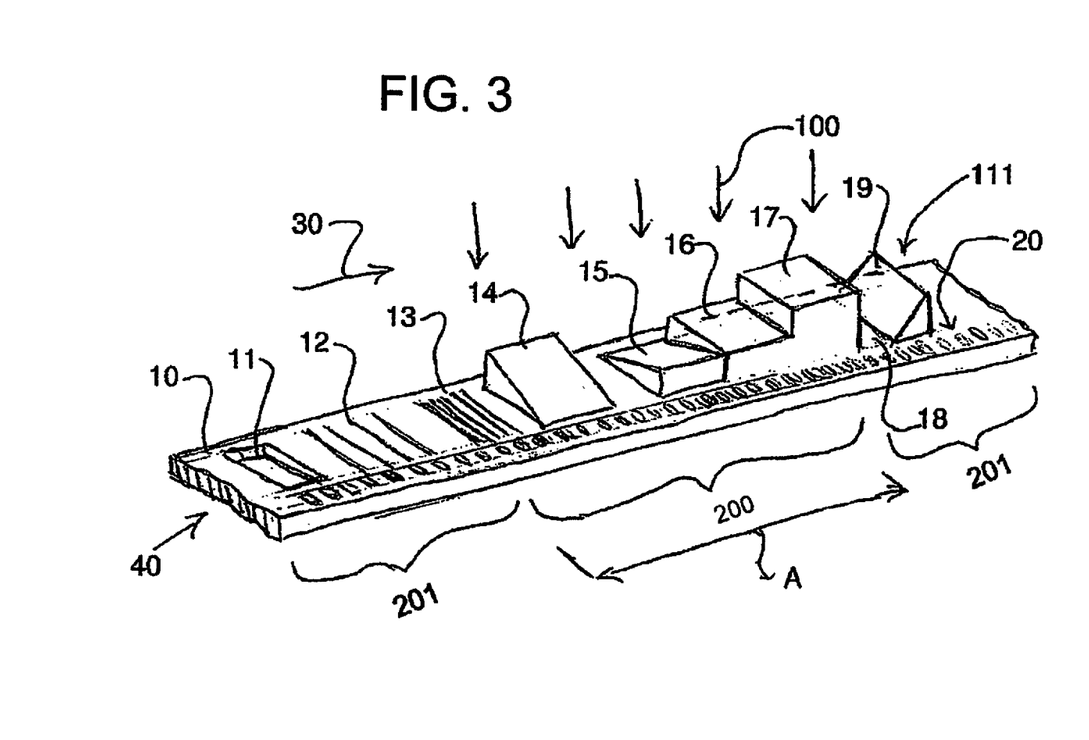
FIG. 3 is taken from PCT publication WO 2020/097733 cited above and shows the optical elements set out in one example of a sequence of conjurations on the common spatial modulator.

FIG. 3 shows a perspective view of the configurations of optical elements which can be used in a preferred embodiment of the invention. A movable substrate 10 in the form of a tape or strip, which forms the common modulator 43 of FIG. 1A, translates from left to right in the direction indicated at 30 at velocity V carrying array 40 of optical elements 111 including components 11, 12, 13, 14, 15, 16, 17, 19 through region 200 where incident electromagnetic radiation is incident on substrate 10. The region 200 is designated the active region and adjacent regions 201 are designated inactive regions. In FIG. 1 and FIG. 2 input ports correspond to active regions in FIG. 3. Optical elements within the active region 200 modulate incident electromagnetic radiation to an 'on' state. Optical elements within the inactive region 201 modulate incident electromagnetic radiation to an 'off' state. The segment shown is preferably part of a closed loop of overall length L. The active region 200 is of length A. Optical elements in the active region will direct incident EM radiation in a distinct direction specified by optical element type for a time A/v with a repeat period L/V.

Optical element 11 is an aperture that allows incident EM radiation to pass through substantially unchanged except for diffraction effects due to the edges of the aperture. The diffraction effects are minimal if the sides of the aperture are much larger than the wavelengths of incident EM radiation. Aperture 11 is within inactive region 201 and hence no EM radiation passes through at the instant in time illustrated. However, aperture 11 will enter active region 200 at a later time as the substrate 10 translates in the direction 30.

Modulation is achieved because transmission through aperture 11 occurs only when aperture 11 is in the active region 200.

Optical elements 12 and 13 are diffraction gratings with different pitch. Incident EM radiation at each wavelength is diffracted into multiple orders. For order 0, EM radiation is reflected into the same direction by diffraction gratings 12 and 13. For orders other than 0, (ie +/−1) diffraction gratings 12 and 13 diffract incident EM radiation into different angles. Diffraction grating 12 is wholly in inactive region 201 and hence no EM radiation is observed at angles determined by the pitch of diffraction grating 12. Diffraction grating 13 is partly in active region 200 and hence directs incident EM into angles determined by the grating pitch for as long as diffraction grating 13 remains within the active region 200. Optical elements 12 and 13 may be diffraction gratings comprised of dynamically adjustable micro mirror arrays that can change pitch while in the inactive region 201 by changing the orientation of rows of micro mirrors.

Optical elements 14 and 15 are mirrors inclined at different angles with respect to the incident EM radiation 100 and consequently said EM radiation is reflected into different angles while mirrors 14 and 15 are within active region 200. A detector placed at the appropriate angle of reflection for each will observe reflected EM radiation, the mere presence could, for example denote a binary T. As the substrate tape 10 translates in direction 30, optical element 15 will enter the inactive region 201 and a short time later optical element 15 will enter the inactive region 201. The absence of reflected EM radiation could, for example represent a binary '0'. In some embodiments the angle of inclination of the mirror elements 14 and 15 can change while said elements are in the inactive region 201.

Optical elements 16 and 17 are reflective mirrors parallel to the substrate surface. Incident EM radiation is reflected at the same angle by each, but with different phase due to the difference in elevation above the mean substrate plane. Optical elements 16 and 17 could, for example be part of a Fabry Perot filter or interferometer. Optical elements 16 and 17 could, for example be part of a step scan Michelson interferometer. As shown, optical elements 16 and 17 are in the active region 200. With translation in direction 30, optical elements 16 and 17 enter the inactive region 201 where, in some embodiments the elevation of the mirror surface may be changed to produce a different phase shift in the next repeat period for the element L/V.

Optical element 19 is a dispersive prism with an adjacent buffer region 18, both lying within inactive region 201. When prism is in the active region 200, incident EM radiation is refracted into an angle determined by the prism geometry and the refractive index of the prism. In some embodiments buffer regions 18 are used to provide an unobstructed optical path for adjacent optical elements. In some embodiments, optical elements abut with no buffer regions.

An array of position indicators is shown at 20 proximate and parallel to array of optical elements 40. As shown the position indicators are apertures that transmit a probe beam (not shown) when part of said aperture intersects the probe beam. A detector (not shown) measures the intensity of transmitted probe beam and a computation device calculates the position of the substrate relative to the probe beam.

The arrangement herein of FIGS. 1A and 1B where the sources, ports and detectors are carried on a rotating disk 45 and the common modulator is held stationary on a second disk 42 relative to the rotation of the disk 45 is particularly useful in the apparatus above cited singulation patent.

Figure 4:
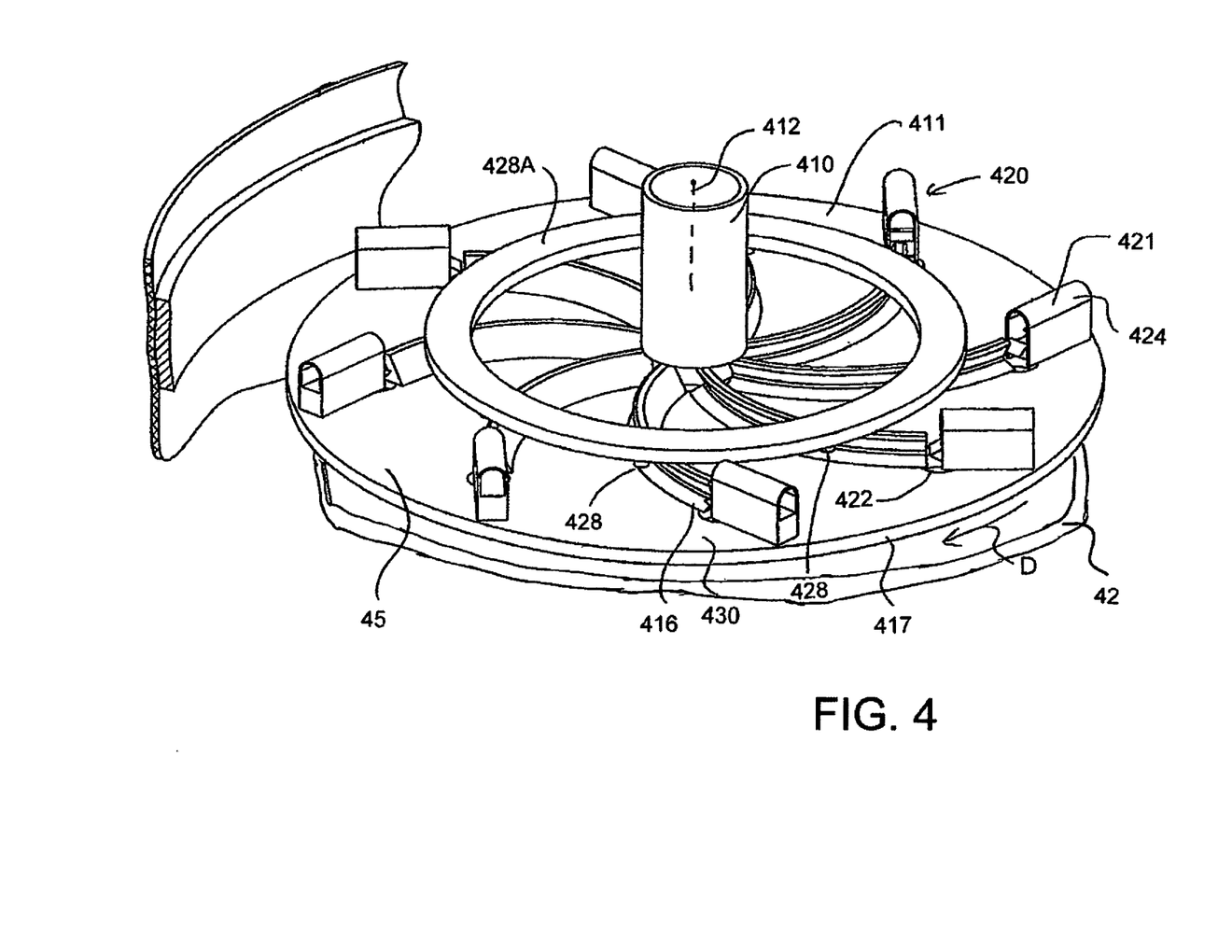
FIGS. 4 and 5 show an arrangement according to the present invention using components taken from U.S. Pat. No. 10,933,447 cited above and show the sources of radiation flux as particles singulated on a disk carrying singulation ducts.
Figure 5:
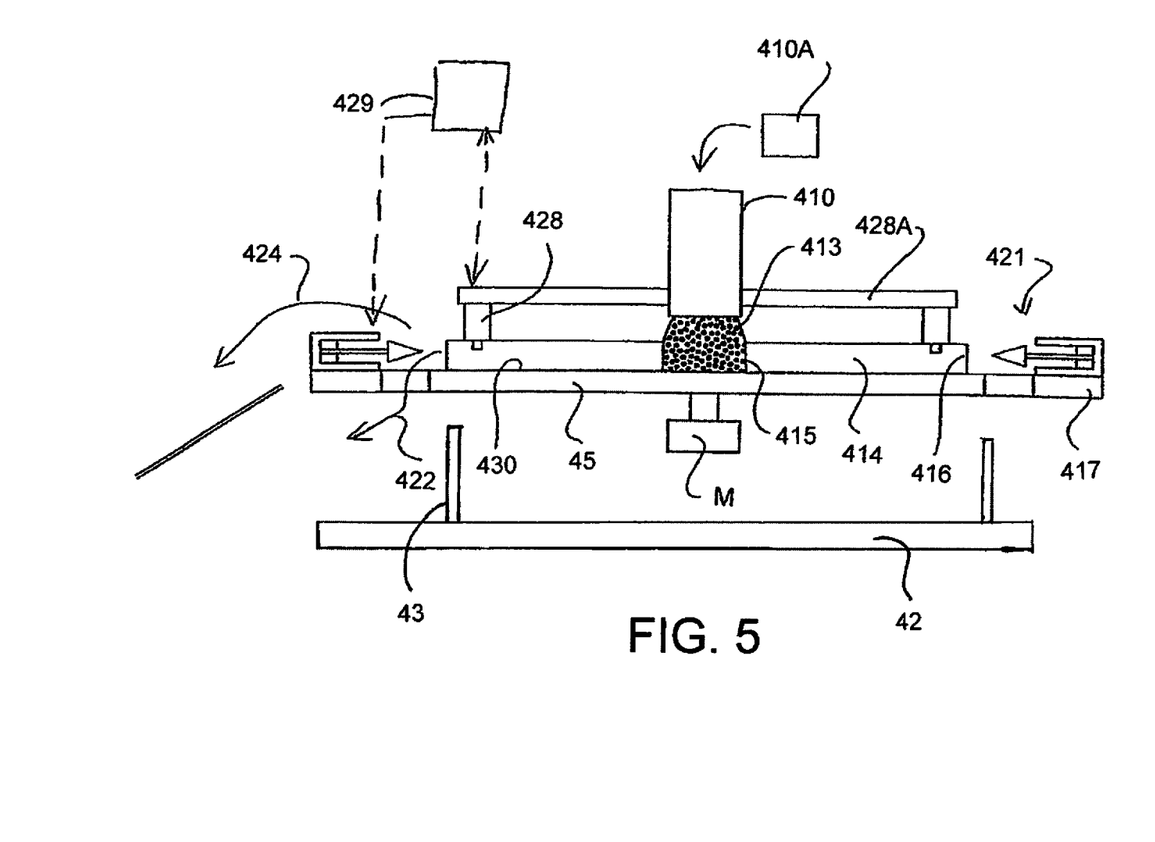

As shown in FIGS. 4 and 5, the disks 42 and 45 are shown and include the components of the spectrometer units 48 to 53 in that arrangement, which are not shown for convenience of illustration. Each spectrometer unit 48 to 53 is associated with a respective channel 414 of the singulation unit shown.

The singulation unit as described in the above cited patent is arranged to separate the particles based on a measurable parameter of the particles.

The apparatus comprises a supply conduit 410 carrying particles to be sorted from a feed supply 410A which supplies the particles in a continuous stream for presentation through the conduit to a rotary body 411 rotatable around an axis 412. In the embodiment shown the rotary body is a flat disk with the axis 412 arranged vertical so that the disk provides an upper horizontal surface onto which the particles 413 are supplied in the stream from the conduit 410. The conduit is arranged at the centre of the disk so that the particles are deposited onto the centre of the position where the disk is rotating but where there is little outward velocity. The velocity of the particles, optionally kernels, at this point is from the flow in the supply conduit 410. The velocity at a point on the disk is v=wr where w is the angular velocity and r is the radius. If kernels are deposited in a region where the change in velocity is too high, they bounce and the flow is chaotic. Kernels are deposited in the central region to minimize the change in velocity.

On the upper surface of the disk forming the rotary body is provided a plurality of ducts 414 each extending from an inner end 15 adjacent the axis outwardly to an outer end 416 spaced at a greater radial distance outwardly from the axis than the inner end. In this embodiment the outer end 416 of the ducts is arranged adjacent to but spaced inwardly from the edge 417 of the disk 411. In this embodiment each duct 414 extends from a position closely adjacent the centre to the periphery 417 of the disk so that the centre the ducts are arranged immediately side by side and the ducts diverge outwardly so that at the outer end 416 they are spaced around the periphery 417.

The inner ends 415 are thus arranged in an array adjacent to the axis so that the supply conduit 410 acts to deposit the particles to be sorted at the inner ends 415 of the ducts for entry of the particles to be sorted into the inner ends. As the inner ends are immediately adjacent at the centre of the disk, the particles there form a pile at the centre which is automatically sorted evenly in to the open mouths of the ducts at their inner ends. Assuming a continuous pile of the particles at the centre, the rotation of the disk will act to evenly sort the particles into the individual ducts in a stream defined by the dimensions of the mouth relative to the dimensions of the particles. At the outset of the path along the duct, the particles will be immediately adjacent or overlapping. However, passage of the particles along the duct while they are accelerated by the centrifugal forces will act to spread the particles each from the next to form a line of particles with no overlap. As the forces increase with increasing radial distance from the axis 412, the particles will be increasingly accelerated and thus the distance between particles will increase along the length of the duct. The kernels align with the duct axially in the first part of the duct and the kernel length defines an initial center to center spacing with some variation due to differences in kernel size. The centrifugal acceleration is uniform at a given radius, but the frictional forces for grain kernels vary by about 20%. The frictional forces scale with the Coriolis force=uN (u=coefficient of friction approximately 0.2 to 0.25, N=normal force to duct wall supplied primarily by the Coriolis force. As set out above, the duct can be shaped to minimize the normal force and friction by curving the duct along the line of net force (mentioned in text earlier). Conversely, the particle acceleration can be reduced by curving the duct to increase normal forces, curving the duct to constant or even decreasing radius, or increasing the coefficient of friction of a selected portion of a duct by changing the texture and/or material.

Selection of the length of the duct relative to the size of the particles can be made so that the spacing between each particle and the particle behind can be selected to be a proportion of the length of the particles. In the example where the separator is used for seeds, the separation between each seed and the next can be at least equal to the length of the seeds and typically 1.5 or 2.0 times the length of the seed.

Thus the ducts are shaped and arranged so that the particles are accelerated as they pass from the inner end to the outer end so as to cause the particles to be aligned one after the other in a row as they move toward the outer end.

The outer ends 416 are arranged in an angularly spaced array at an outer periphery of the rotary body so that the particles of the row of particles in each duct are released by centrifugal force from the disk outwardly from the axis of the disk. The openings all lie in a common radial plane of the disk. The ducts can be formed either as grooves cut into the upper surface of a thicker disk or by additional walls applied on to the top surface of the disk, or two-dimensional and/or three-dimensional shaped guides.

An array 420 of particle separating devices 421 is arranged in an annulus at the outer edge 417 of the disk so that the individual separating devices 421 are arranged at angularly spaced positions around the disk.

Each separating device is operable to direct each particle into one of a plurality of paths as determined by operation of the separating devices In order to control the separating devices 421, there is provided a measuring system generally indicated at 428 which is used to measure a selected parameter or parameters of the particles as those particles move from the end of the duct at the edge of the disk toward the separating devices. The measuring devices are carried on a mounting ring 428A.

The measuring system can be of any suitable type known in this industry for example optical measuring systems which detect certain optical characteristics of the particles to determine the particular parameters required to be measured. Other measuring systems can also be used since the type of system to be used and the parameters to be selected are not part of the present invention.

In a typical example, the analysis of the particles relates to the presence of degradation of the seed due to disease and this can often be detected optically for example using the systems and disclosed in the above cited prior U.S. Pat. No. 8,227,719.

Each separating device 421 is associated with a respective detecting device 428, which may include multiple detecting components, operable to measure the parameter of the particles and in response to the parameters measured by the associated detecting device, the respective or separating device is operated to select the path 422 or the path 424.

It will be appreciated that the number of paths can be modified to include more than two paths if required depending upon the parameters to be measured. Such selection to an increased number of paths can be carried out by providing subsequent separating devices 421 positioned downstream of the initial separation. In this way one or both of the paths can be divided into two or more subsidiary paths with all of the separating devices being controlled by a control system 429 receiving the data from the measuring device 428.

The disk 411 thus has a front face 430 facing the supply conduit and the ducts 414 lie in a radial plane of the disk and extend outwardly from the axis to a periphery 417 of the disk 411.

The invention claimed is:

1. A method for measuring a property of each of a plurality of radiation fluxes where each radiation flux arises from a different one of a plurality of radiation sources, comprising the steps of
   collecting each radiation flux independently of others of the plurality of radiation fluxes;
   each independently collected radiation flux from a respective one of the sources being associated with a respective one of a plurality of separate modulation ports where each collected radiation flux is directed to the respective one of the modulation ports;
   providing a spatial modulator common to all of the radiation sources;
   the common spatial modulator having a sequence of configurations where, in each of the sequence of configurations the common spatial modulator acts upon the radiation flux from a respective one of the sources to cause the radiation flux to pass along a selected one of a plurality of modulated flux paths;
   cycling the common spatial modulator such that the common spatial modulator passes each of the modulation ports so that the sequence of configurations is applied to the radiation flux from the respective source associated with each modulation port;
   providing a plurality of detectors associated with the radiation fluxes and for each radiation flux measuring an amplitude of the radiation flux along each modulated flux path;
   and analyzing the radiation flux amplitudes associated with each modulation port to provide information about a property of the radiation flux from each of the plurality of radiation sources.

2. The method according to claim 1 wherein the radiation flux from each different source is directed by the sequence of configurations in different directions based on a property of the radiation flux.

3. The method according to claim 1 wherein the detectors are carried on a first member which is in relative motion with respect to the common spatial modulator.

4. The method according to claim 1 wherein the common spatial modulator is moved relative to the modulation ports so that the sequence of configurations moves past each of the modulation ports in turn.

5. The method according to claim 4 wherein the common spatial modulator is arranged in a circle around an axis of rotation and wherein at least one of the common spatial modulator and the modulation ports is rotated around the axis.

6. The method according to claim 5 wherein the common spatial modulator is arranged in a cylindrical surface surrounding the axis.

7. The method according to claim 5 wherein the common spatial modulator is stationary and the modulation ports are rotated.

8. The method according to claim 1 wherein each source comprises a particle, the properties of which are to be analyzed and the radiation flux is interaction radiation reflected, scattered or emitted from the particle.

9. The method according to claim 8 wherein the particles are singulated in an aligned row of the particles in a respective one of a plurality of singulation ducts.

10. The method according to claim 1 wherein at least one source is a reference source where the radiation flux of said at least one source has not interacted with a sample source to be analyzed.

11. The method according to claim 10 wherein the sample and reference sources are compared.

12. The method according to claim 1 wherein a plurality of the modulation ports receive said radiation flux from different spatial regions of a single sample material.

13. The method according to claim 1 including measuring a position of the common spatial modulator at least at two different times.

14. A method for measuring a property of each of a plurality of radiation fluxes where each radiation flux arises from a different one of a plurality of radiation sources, comprising the steps of
collecting each radiation flux independently of others of the plurality of radiation fluxes;
providing a spatial modulator common to all of the radiation sources;
the common spatial modulator having a sequence of configurations, each of which configurations causes the radiation flux to pass along one or more modulated flux paths
each radiation flux being associated with a respective one of a plurality of separate modulation ports where each radiation flux passes to a respective one of the modulation ports;
cycling the common spatial modulator past each of the modulation ports so that the sequence of configurations is applied to each modulation port;
providing a plurality of detectors associated with the radiation fluxes and for each radiation flux measuring an amplitude of the radiation flux along each modulated flux path;
and analyzing the radiation flux amplitudes associated with each modulation port to provide information about a property of the radiation flux from each of the plurality of radiation sources;
wherein the sequence of configurations comprises an ordered array of optical elements on a substrate and wherein the array of optical elements has at least three optical elements and at least two optical elements which modulate said radiation flux incident thereon differently.

15. The method according to claim 14 wherein the optical elements of the spatial modulator direct said radiation flux into at least two different directions.

16. The method according to claim 14 wherein the optical elements of the common spatial modulator produce at least two different phase changes in the radiation flux.

17. The method according to claim 14 wherein the optical elements of the common spatial modulator alter a polarization of said radiation flux in at least two and preferably three different ways.

18. The method according to claim 14 wherein the optical elements of the common spatial modulator are integral to the substrate.

19. The method according to claim 14 wherein the substrate is a rotating disk and the optical elements are arranged at a common radial distance from a rotation axis.

20. The method according to claim 14 wherein the optical elements are chosen from the set of aperture, mirror, diffraction grating, phase plate, reflecting wedge, refracting prism, and polarizer.

21. The method according to claim 14 wherein the optical elements comprise at least one mirror that can take at least two different configurations.

22. The method according to claim 21 wherein said at least one mirror changes configuration at least once and said configuration change occurs when said mirror is not exposed to said radiation flux.

23. The method according to claim 1 wherein the detector is a linear array that measures a modulated property in one direction and an un-modulated property in another direction to produce a linear spectral image wherein the modulated property is wavelength and the un-modulated property is a spatial coordinate.

24. The method according to claim 23 wherein further a plurality of modulation ports are each configured to receive radiation amplitudes from sample regions along the modulation direction, each said modulation port associated with a linear array detector to produce a linear spectral image, and the linear spectral images from said plurality of ports are combined to produce a two dimensional spectral image.

25. The method according to claim 14 wherein the detector is a linear array that measures a modulated property in one direction and an un-modulated property in another direction to produce a linear spectral image wherein the modulated property is wavelength and the un-modulated property is a spatial coordinate.

26. The method according to claim 25 wherein further a plurality of modulation ports are each configured to receive radiation amplitudes from sample regions along the modulation direction, each said modulation port associated with a linear array detector to produce a linear spectral image, and the linear spectral images from said plurality of ports are combined to produce a two dimensional spectral image.

27. A method for measuring a property of each of a plurality of radiation fluxes where each radiation flux arises from a different one of a plurality of radiation sources, comprising the steps of
collecting each radiation flux independently of others of the plurality of radiation fluxes;
providing a spatial modulator common to all of the radiation sources;
the common spatial modulator having a sequence of configurations, each of which configurations causes the radiation flux to pass along one or more modulated flux paths;
each radiation flux being associated with a respective one of a plurality of separate modulation ports where each radiation flux passes to a respective one of the modulation ports;
cycling the common spatial modulator past each of the modulation ports so that the sequence of configurations is applied to each modulation port;
providing a plurality of detectors associated with the radiation fluxes and for each radiation flux measuring an amplitude of the radiation flux along each modulated flux path;
and analyzing the radiation flux amplitudes associated with each modulation port to provide information about a property of the radiation flux from each of the plurality of radiation sources;

wherein the common spatial modulator is moved relative to the modulation ports so that the sequence of configurations moves past each of the modulation ports in turn;

wherein the common spatial modulator is arranged around an axis of rotation and wherein the common spatial modulator is stationary and the modulation ports are rotated around the axis.

28. The method according to claim 27 wherein the detector is a linear array that measures a modulated property in one direction and an un-modulated property in another direction to produce a linear spectral image wherein the modulated property is wavelength and the un-modulated property is a spatial coordinate.

29. The method according to claim 28 wherein further a plurality of modulation ports are each configured to receive radiation amplitudes from sample regions along the modulation direction, each said modulation port associated with a linear array detector to produce a linear spectral image, and the linear spectral images from said plurality of ports are combined to produce a two dimensional spectral image.

30. A method for measuring a property of each of a plurality of radiation fluxes where each radiation flux arises from a different one of a plurality of radiation sources, comprising the steps of collecting each radiation flux independently of others of the plurality of radiation fluxes;

each independently collected radiation flux from a respective one of the sources being associated with a respective one of a plurality of separate modulation ports where each collected radiation flux is directed to the respective one of the modulation ports;

providing a spatial modulator common to all of the radiation sources;

the common spatial modulator having a sequence of configurations where, in each of the sequence of configurations the common spatial modulator acts upon the radiation flux from a respective one of the sources to cause Hadamard modulation of the radiation flux;

cycling the common spatial modulator such that the common spatial modulator passes each of the modulation ports so that the sequence of configurations is applied to the radiation flux from the respective source associated with each modulation port;

providing a respective detector associated with each of the radiation fluxes and for each radiation flux measuring an amplitude of the Hadamard modulated radiation flux;

and analyzing the radiation flux amplitudes associated with each modulation port to provide information about a property of the radiation flux from each of the plurality of radiation sources.

31. The method according to claim 30 wherein the detector is a linear array that measures a modulated property in one direction and an un-modulated property in another direction to produce a linear spectral image wherein the modulated property is wavelength and the un-modulated property is a spatial coordinate.

32. The method according to claim 31 wherein further a plurality of modulation ports are each configured to receive radiation amplitudes from sample regions along the modulation direction, each said modulation port associated with a linear array detector to produce a linear spectral image, and the linear spectral images from said plurality of ports are combined to produce a two dimensional spectral image.

* * * * *